Feb. 10, 1970   F. W. LINDBLAD   3,494,348
CORE DRILL
Filed Feb. 20, 1967
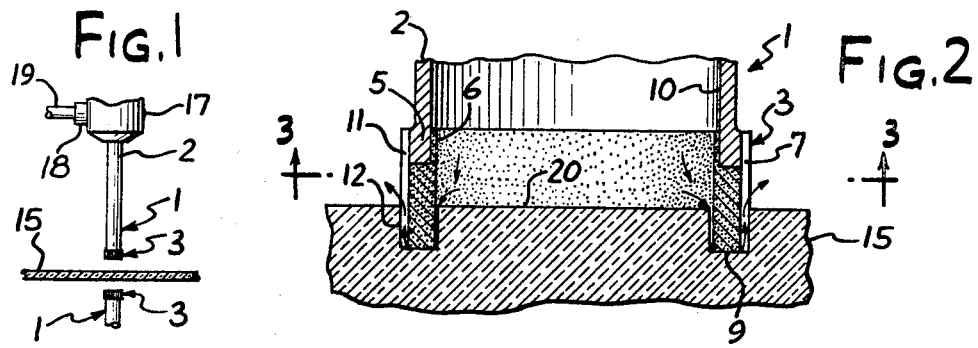
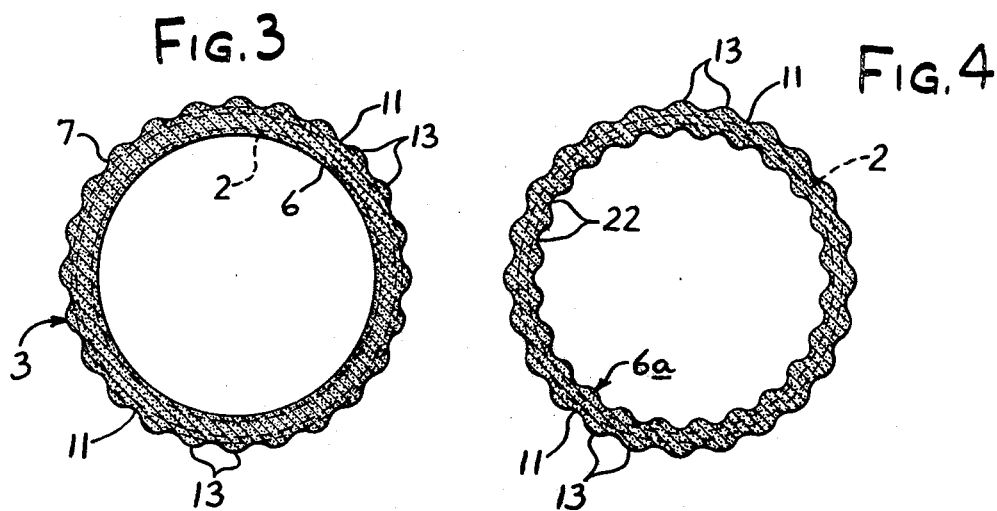
INVENTOR
FREDERICK W. LINDBLAD
by: Spector + Alster
ATTYS.

United States Patent Office 3,494,348
Patented Feb. 10, 1970

3,494,348
CORE DRILL
Frederick W. Lindblad, Aurora, Ill., assignor to TRW, Inc., Cleveland, Ohio, a corporation of Ohio
Filed Feb. 20, 1967, Ser. No. 617,207
Int. Cl. B28d 1/14
U.S. Cl. 125—20                               1 Claim

ABSTRACT OF THE DISCLOSURE

A core drill has a tubular body of diamond abrasive particles embedded in a matrix. The outer surface of the body has longitudinal grooves to facilitate removal of swarf by cooling liquid that flows from the inside of the body across the end-abrading surface and through the grooves.

---

This invention relates to improvements in core drills, particularly those of the type used for boring holes in glass.

In a core drill of the type stated, the abrading or cutting portion of the drill may be formed of diamond-abrasive particles embedded in a matrix. In drilling glass, the swarf generated at the abrading surface is of the order of micron size. This swarf has an eroding effect on the matrix in which the diamond-abrasive is embedded, thereby reducing the life of the drill.

It is an object of this invention to provide a core drill of the type stated which is so designed as to facilitate a maximum of swarf removal so as to reduce the amount of matrix erosion and prolong the useful life of the drill. In accordance with this object of the invention, the outer cylindrical surface of the abrasive member is shaped to provide small regions of contact with the work and comparatively large longitudinal grooves which serve as channels through which the swarf may be flushed away by coolant that passes across the abrading surface of the tool.

It is a further object of this invention to provide a core drill of the type stated in which the diamond-abrading portion has an inner cylindrical tool surface which is a surface of revolution throughout 360 degrees.

The attainment of the above and further objects of this invention will be apparent from the following description taken in conjunction with the accompanying drawing forming a part thereof.

In the drawing:

FIG. 1 is a fragmentary elevational view showing one manner of using core drills of the present invention;

FIG. 2 is an enlarged fragmentary sectional view taken through the longitudinal axis of the drill and showing the drill in operation;

FIG. 3 is a sectional view taken along line 3—3 of FIG. 2; and

FIG. 4 is a sectional view similar to FIG. 3 but showing a modified form of the present invention which may be useful under certain conditions.

Referring now in more detail to the drawing wherein like reference characters indicate like parts throughout, 1 designates a core drill comprising a cylindrical steel supporting tube or shank 2 and a cylindrical body forming an abrading member 3 coaxial therewith. The abrading member 3 is formed of diamond-abrasive particles embedded in a suitable matrix, for instance tungsten carbide. One end 5 of the tube 2 may be slightly enlarged and embedded in one axial end of the abrading member 3. The abrading member 3 may be separately molded in a manner known in the art with a notch at one end corresponding substantially to the configuration of the tube end 5, and then the tube 2 and abrading member 3 may be silver soldered or otherwise bonded together. Alternatively, the abrading member 3 may be directly molded onto the tube 2.

The abrading member 3 is formed with inner and outer generally cylindrical surfaces 6, 7 which extend substantially for the full length of the abrading member 3 and terminate in an axially presented, ring-shaped abrading surface 9. In the form of the invention shown in FIGS. 2 and 3, the inner surface 6 is a surface of revolution having a diameter which is less than the diameter of the bore supporting the tube 2. The outer surface 7 is a curve of varying distance from the center of rotation of the tool and is contoured to form grooves 11 which extend longitudinally of the member 3 from the abrading surface 9 to the tube 2. The radially outer openings of the grooves 11, which are the widest parts of the grooves, are at radially outer regions 13 which contact the surface 12 of the hole being drilled. Ideally, the regions 13 should be as narrow in the circumferential direction as possible. However, because of the irregularity of the shapes and disposition of the diamond particles in the matrix and the need for dressing the tool after the member 3 and tube 2 have been assembled, the regions 13 may be in the form of narrow bands. In one construction wherein the drill is to be used for drilling a nominal one-half inch diameter hole, the regions 13 were about fifteen degrees apart from center to center, the radial depth of the grooves 11 was about 0.023 inch, the diameter of the member 3 across the regions 13 was about 0.523 inch, and the diameter of the inner surface 6 was about 0.420 inch.

FIG. 1 shows a typical manner in which the drills of the present invention are used for drilling a hole in automotive plate glass 15, which is usually ¼ inch nominal thickness. The tube 2 is held in a rotary drill chuck 17, and a manifold 18 is attached to the chuck mechanism in a customary manner so that cooling water may be supplied from a pipe 19 to admit the water into the bore 10 of the tube. A similar arrangement is provided for the lower drill illustrated, which is coaxial with the upper drill. Thus, each drill forms a part of the core 20 (FIG. 2) so that when the two have completed their cycle of operation, the core 20 has been fully cut from the glass.

As the rotating drill enters the glass 15, the water will pass continuously from the bore 10 into the center hollow of the abrading member 3. As shown by the arrows in FIG. 2, the coolant flows between the inner surface 6 and the core 20, then between the abrading surface 9 and the adjacent surface of the work, and then longitudinally over the tool surface 7 through the grooves 11. The grooves 11 should form fluid passageways sufficiently large to permit swarf removal at a rate rapid enough to prevent tapering or barreling of the abrasive member 3 in excess of the dimensional tolerances of the hole being drilled. The coolant carries away the swarf and thereby also reduces the abrading effect of the swarf on the matrix of the abrading member 3. The diamond particles protrude sufficiently from the surface of the drill so that water pressure on the order of 30 to 50 pounds per square inch will cause a flow of sufficient water between the surface 6 and core 20 and across the abrading surface 9. No longitudinal grooves are necessary at the surface 9.

In the form of the invention shown in FIGS. 2 and 3, inside tool surface 6 is devoid of longitudinal grooves or other special means for forming water passageways. The presence of longitudinal grooves on the inside surface 6 is detrimental because such grooves reduce the area of the abrading surface 9 to the extent of the cross sectional areas of the grooves. Thus, by having the inner surface 6 a surface of revolution throughout 360 degrees, and hence devoid of longitudinal grooves, the area of the abrading surface 9 is greater than that of a similarly sized abrading member with inside grooves. This results in a stronger abrading member and a tool which cuts faster. Viewed another way, the abrading member without inside longitudinal grooves may be made thinner than one with grooves and still have comparable strength.

Despite the drawbacks resulting from the provision of longitudinal grooves on the inside surface of the abrasive member, it is, of course, possible to provide such grooves 22 on the inside surface 6a, as shown in FIG. 4, under those special circumstances wherein the disadvantages of the grooves 22 are less than the advantages that result from a greater flow of coolant that is made possible by the grooves. One such special situation may be for coring a precision hole in which the core is to remain attached to the work, wherein the diamond grit is extremely fine and wherein the available water pressure is low.

It is understood that the invention is not limited to the precise constructions herein shown, the same being merely illustrative of the principles of the invention. What is considered new and sought to be secured by Letters Patent is:

1. A core drill comprising a cylindrical supporting tube, and abrading means having diamond abrasive particles embedded in a matrix, said abrading means having a body with an inner tool surface surrounded by an outer tool surface, said surfaces being joined at one end of the body by an end abrading surface so that as said body is advanced axially into the work with said body rotating about its central axis, the abrading surface removes material from the work and leaves a cylindrical core of work, and said abrading means having means forming circumferentially spaced fluid passageways at said outer tool surface for carrying away fluid and swarf from said abrading surface, and said inner tool surface being a surface of revolution throughout 360 degrees, the adjacent fluid passageways being spaced from one another by regions in contact with the work, the arcuate dimension of each such region being less than the arcuate extent of an adjacent passageway.

References Cited
UNITED STATES PATENTS

| | | | |
|---|---|---|---|
| 2,811,960 | 11/1957 | Fessel | 125—15 |
| 2,996,061 | 8/1961 | Miller | 125—20 |
| 3,033,298 | 5/1962 | Johnson. | |
| 3,353,526 | 11/1967 | Daem | 125—15 |

HAROLD D. WHITEHEAD, Primary Examiner

U.S. Cl. X.R.

51—209